United States Patent
Chen

(10) Patent No.: US 11,088,624 B2
(45) Date of Patent: Aug. 10, 2021

(54) VOLTAGE CONVERSION APPARATUS FOR IMPLEMENTING ZERO-VOLTAGE SWITCHING BASED ON RECOVERING LEAKAGE INDUCTANCE ENERGY

(71) Applicant: Power Forest Technology Corporation, Hsinchu County (TW)

(72) Inventor: Tso-Min Chen, Hsinchu (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days.

(21) Appl. No.: 16/831,835

(22) Filed: Mar. 27, 2020

(65) Prior Publication Data
US 2021/0036609 A1 Feb. 4, 2021

Related U.S. Application Data

(60) Provisional application No. 62/880,086, filed on Jul. 30, 2019.

(30) Foreign Application Priority Data

Feb. 18, 2020 (TW) .................................. 109105104

(51) Int. Cl.
*H02M 3/335* (2006.01)
*H02M 3/155* (2006.01)

(52) U.S. Cl.
CPC ....... *H02M 3/33523* (2013.01); *H02M 3/155* (2013.01); *H02M 3/1552* (2021.05)

(58) Field of Classification Search
CPC ... H02M 2001/006; H02M 2001/0058; H02M 2001/0048; H02M 1/34; H02M 3/335-42; H02M 1/0058; H02M 1/0048; H02M 1/0006
See application file for complete search history.

(56) References Cited

U.S. PATENT DOCUMENTS

| 5,267,133 | A | * | 11/1993 | Motomura | ............... | H02M 1/34 |
| | | | | | | 363/21.03 |
| 5,402,329 | A | | 3/1995 | Wittenbreder, Jr. | | |
| 10,250,151 | B1 | * | 4/2019 | Wu | ................... | H02M 3/33592 |

FOREIGN PATENT DOCUMENTS

| CN | 1418398 | 5/2003 |
| CN | 108923661 | 11/2018 |
| TW | 201414163 | 4/2014 |
| WO | 2008120014 | 10/2008 |

OTHER PUBLICATIONS

Junming Zhang, et al., "A High Efficiency Flyback Converter With New Active Clamp Technique." IEEE Transactions on Power Electronics, vol. 25, No. 7, Jul. 2010, pp. 1775-1785.

* cited by examiner

*Primary Examiner* — Peter M Novak
(74) *Attorney, Agent, or Firm* — JCIPRNET

(57) ABSTRACT

A voltage conversion apparatus for implementing zero-voltage switching based on recovering leakage inductance energy is provided. A leakage inductance energy recovery circuit is coupled to a primary side auxiliary winding and a control circuit, and recovers leakage inductance energy of a transformer circuit to supply an operating power to the control circuit. Before a main switch is turned on the next time, leakage inductance energy recovered previously is used to lower a cross-voltage of the main switch, so that transient loss of conduction of the main switch is eliminated or reduced, and circuit efficiency is improved.

5 Claims, 3 Drawing Sheets

VOLTAGE CONVERSION APPARATUS FOR IMPLEMENTING ZERO-VOLTAGE SWITCHING BASED ON RECOVERING LEAKAGE INDUCTANCE ENERGY

CROSS-REFERENCE TO RELATED APPLICATION

This application claims the priority benefits of U.S. provisional application Ser. No. 62/880,086, filed on Jul. 30, 2019, and Taiwan application serial no. 109105104, filed on Feb. 18, 2020. The entirety of each of the above-mentioned patent applications is hereby incorporated by reference herein and made a part of this specification.

BACKGROUND

Technical Field

The disclosure relates to an electronic apparatus, and in particular, to a voltage conversion apparatus.

Description of Related Art

With the social consensus on energy conservation and carbon reduction, it has become an important indicator to improve the conversion efficiency of a power conversion apparatus. However, during actual application, energy leakage of the power conversion apparatus often leads to reduced conversion efficiency of the power conversion apparatus. For example, in terms of a flyback power conversion apparatus, a transformer is mainly used to implement energy conversion. However, a problem of leakage inductance exists in the transformer. Therefore, the flyback power conversion apparatus is inevitably subject to energy loss caused by the leakage inductance, resulting in reduced conversion efficiency and increased switch stress of the power conversion apparatus. Therefore, how to solve problems such as increased switch stress and reduced conversion efficiency caused by leakage inductance energy has become an important issue in the improvement of the power conversion apparatus.

SUMMARY

The invention provides a voltage conversion apparatus which can effectively recover leakage inductance energy and reduce energy loss of the voltage conversion apparatus.

The voltage conversion apparatus in the invention includes a transformer circuit, a main switch, a control circuit, and a leakage inductance energy recovery circuit. The transformer circuit includes a primary side winding, a primary side auxiliary winding, and a secondary side winding, receives an input voltage, and outputs an output voltage to a load. The main switch is coupled between the primary side winding and a ground. The control circuit is coupled to the main switch, and controls the main switch to periodically switch between an on-state and an off-state to control output of the transformer circuit. The leakage inductance energy recovery circuit is coupled to the primary side auxiliary winding and the control circuit, and recovers leakage inductance energy of the transformer circuit to supply an operating power to the control circuit. Before the main switch is turned on the next time, energy conversion of the leakage inductance energy recovered by the leakage inductance energy recovery circuit is used to lower a cross-voltage of the main switch.

In an embodiment of the invention, the main switch provides a cross-voltage energy storage recovery path during a period of cross-voltage energy storage recovery before entering an on-state, to perform energy conversion on the leakage inductance energy stored in the leakage inductance energy recovery circuit, so that the cross-voltage of the main switch is lower than a preset voltage when the main switch is switched from an off-state to an on-state.

In an embodiment of the invention, the leakage inductance energy recovery circuit includes a first capacitor, an auxiliary switch, a diode, and a second capacitor. A first terminal of the first capacitor is coupled to the primary side auxiliary winding. The auxiliary switch is coupled between a second terminal of the first capacitor and the ground, and a control terminal of the auxiliary switch is coupled to the control circuit. The control circuit turns on the auxiliary switch during a period of cross-voltage energy storage recovery before the main switch enters an on-state, to provide a cross-voltage energy storage recovery path. Therefore, the cross-voltage of the main switch is lower than a preset voltage when the main switch is switched from an off-state to an on-state. An anode and a cathode of the diode are respectively coupled to the second terminal of the first capacitor and the control circuit. The second capacitor is coupled between the cathode of the diode and the ground.

In an embodiment of the invention, the main switch and the auxiliary switch are transistors.

In an embodiment of the invention, the voltage conversion apparatus further includes a snubber circuit. The snubber circuit is coupled between two terminals of the primary side winding.

In an embodiment of the invention, the snubber circuit includes a capacitor, a resistor, and a diode. A first terminal of the capacitor is coupled to a first terminal of the primary side winding. A first terminal of the resistor is coupled to the first terminal of the primary side winding. A cathode of the diode is coupled to the capacitor and a second terminal of the resistor, and an anode of the diode is coupled to a second terminal of the primary side winding.

Based on the foregoing, according to the embodiment of the invention, the leakage inductance energy recovery circuit recovers the leakage inductance energy of the transformer circuit to supply the operating power to the control circuit, and during a period in which the main switch is in an off-state, the energy conversion of leakage inductance energy recovered previously is used to recover energy of the cross-voltage of the main switch before the main switch enters an on-state, to implement zero voltage switching. In addition, the leakage inductance energy of the transformer circuit tends to be preferentially stored in the leakage inductance energy recovery circuit when the main switch is switched to an off-state the next time, thereby reducing loss of the snubber circuit.

In order to make the aforementioned features and advantages of the invention more comprehensible, embodiments accompanied with figures are described in detail below.

DESCRIPTION OF THE EMBODIMENTS

Figure 1:
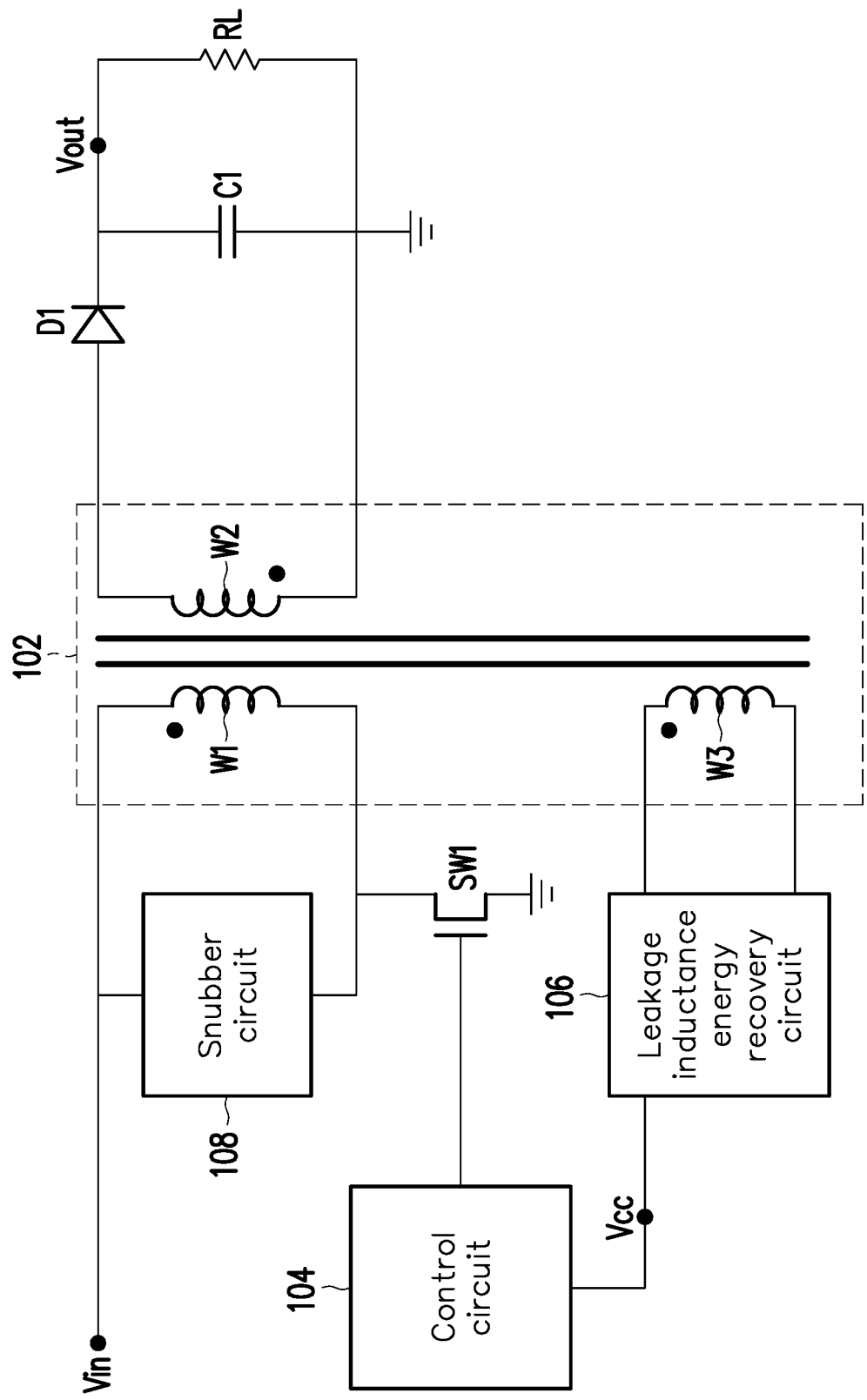
FIG. 1 is a schematic diagram of a voltage conversion apparatus according to an embodiment of the invention.

FIG. 1 is a schematic diagram of a voltage conversion apparatus according to an embodiment of the invention. The voltage conversion apparatus includes a transformer circuit 102, a control circuit 104, a leakage inductance energy recovery circuit 106, a snubber circuit 108, and a main switch SW1. The transformer circuit 102 includes a primary side winding W1, a secondary side winding W2, and a primary side auxiliary winding W3. A first terminal of the primary side winding W1 receives an input voltage Vin. The main switch SW1 is coupled between a second terminal of the primary side winding W1 and the ground. A control terminal of the main switch SW1 is coupled to the control circuit 104. In the present embodiment, the main switch SW1 is implemented by a transistor. However, the invention is not limited thereto. The snubber circuit 108 is coupled between two terminals of the primary side winding W1. The leakage inductance energy recovery circuit 106 is coupled to the primary side auxiliary winding W3 and the control circuit 104. In addition, one terminal of the secondary side winding W2 is coupled to an anode of a diode D1. The other terminal of the secondary side winding W2 is coupled to the ground. A capacitor C1 is coupled between a cathode of the diode D1 and the ground. A common contact between the cathode of the diode D1 and the capacitor C1 is used to generate an output voltage Vout to a load RL.

The control circuit 104 may control the main switch SW1 to periodically switch between an on-state and an off-state to control output of the transformer circuit 102. The leakage inductance energy recovery circuit 106 may recover and store leakage inductance energy of the transformer circuit 102 when the main switch SW1 is in an off-state. The stored leakage inductance energy may be provided to the control circuit 104 for use as operating power Vcc. In addition, the leakage inductance energy recovery circuit 106 may further provide a cross-voltage energy storage recovery path when the main switch SW1 is in an off-state, so as to reconvert and use the leakage inductance energy stored by the leakage inductance energy recovery circuit 106. For example, during a period of cross-voltage energy storage recovery before the main switch SW1 is about to enter an on-state, energy conversion is performed by using the leakage inductance energy stored previously to recover energy of a cross-voltage of the main switch SW1, so that the cross-voltage of the main switch SW1 is lower than a preset voltage when the main switch SW1 is switched from an off-state to an on-state, thereby implementing zero voltage switching. In addition, electric energy stored by the leakage inductance energy recovery circuit 106 is released when being transferred as the energy of the cross-voltage of the main switch SW1 for recovery. Therefore, when the main switch SW1 is switched to an off-state the next time, the leakage inductance energy recovery circuit 106 is in an overloaded state to enable the leakage inductance energy of the transformer circuit 102 to be preferentially stored in the leakage inductance energy recovery circuit 106 before the leakage inductance energy may be guided to the snubber circuit 108, thereby effectively reducing loss of the snubber circuit 108.

Figure 2:
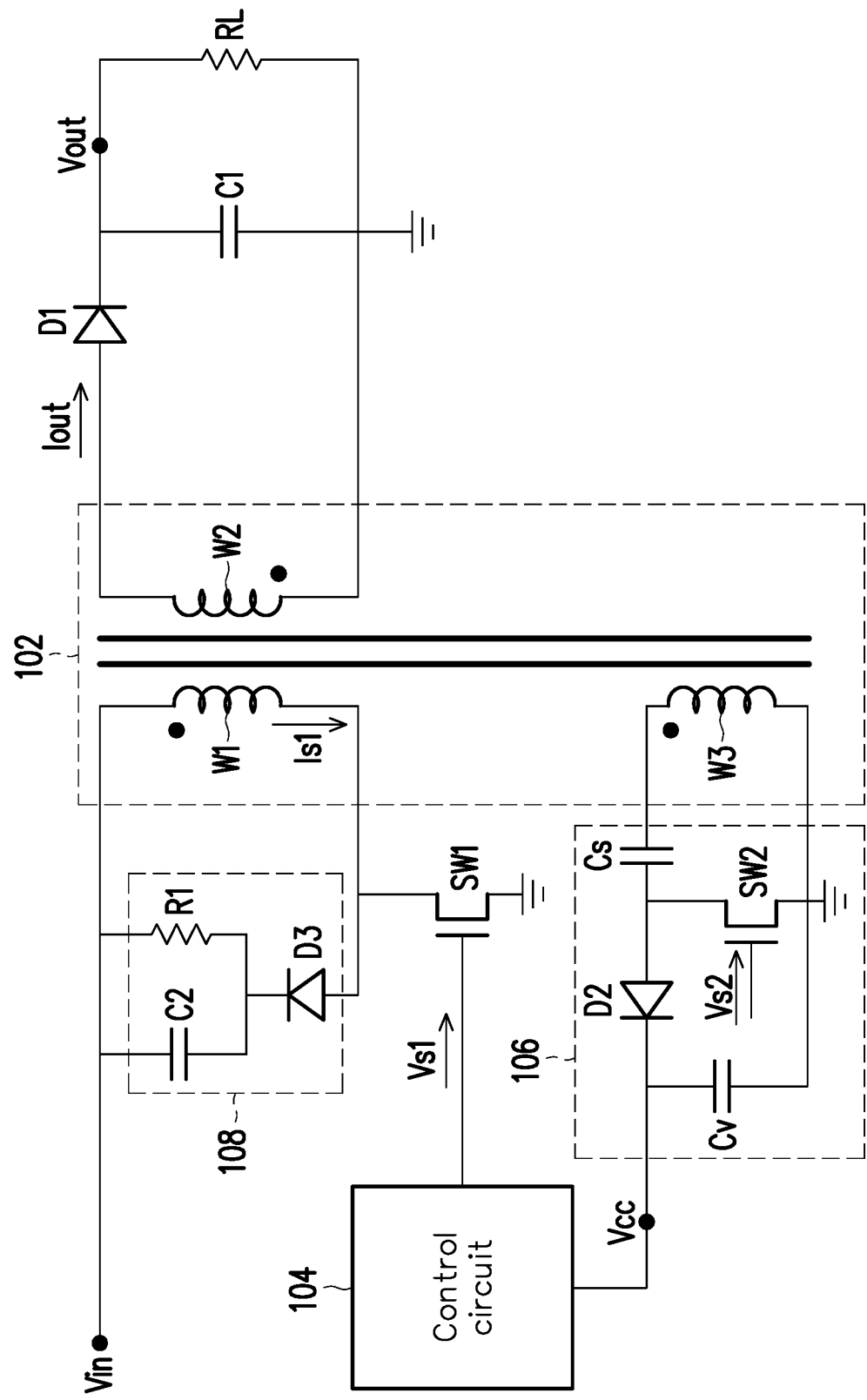
FIG. 2 is a schematic diagram of a voltage conversion apparatus according to another embodiment of the invention.

FIG. 2 is a schematic diagram of a voltage conversion apparatus according to another embodiment of the invention. Furthermore, an implementation of the voltage conversion apparatus may be shown in FIG. 2. In the present embodiment, the leakage inductance energy recovery circuit 106 may include capacitors Cs and Cv, an auxiliary switch SW2, and a diode D2. A first terminal of the capacitor Cs is coupled to a first terminal of the primary side auxiliary winding W3. A second terminal of the primary side auxiliary winding W3 is coupled to the ground. The auxiliary switch SW2 is coupled between a second terminal of the capacitor Cs and the ground. A control terminal of the auxiliary switch SW2 is coupled to the control circuit 104. In the present embodiment, the auxiliary switch SW2 is implemented by a transistor. However, the invention is not limited thereto. An anode and a cathode of the diode D2 are respectively coupled to the second terminal of the capacitor Cs and the control circuit 104. The capacitor Cv is coupled between the cathode of the diode D2 and the ground. In addition, the snubber circuit 108 includes a resistor R1, a capacitor C2, and a diode D3. First terminals of the resistor R1 and the capacitor C2 are coupled to the first terminal of the primary side winding W1. Second terminals of the resistor R1 and the capacitor C2 are coupled to the cathode of the diode D2. The anode of the diode D2 is coupled to the second terminal of the primary side winding W1.

Figure 3:
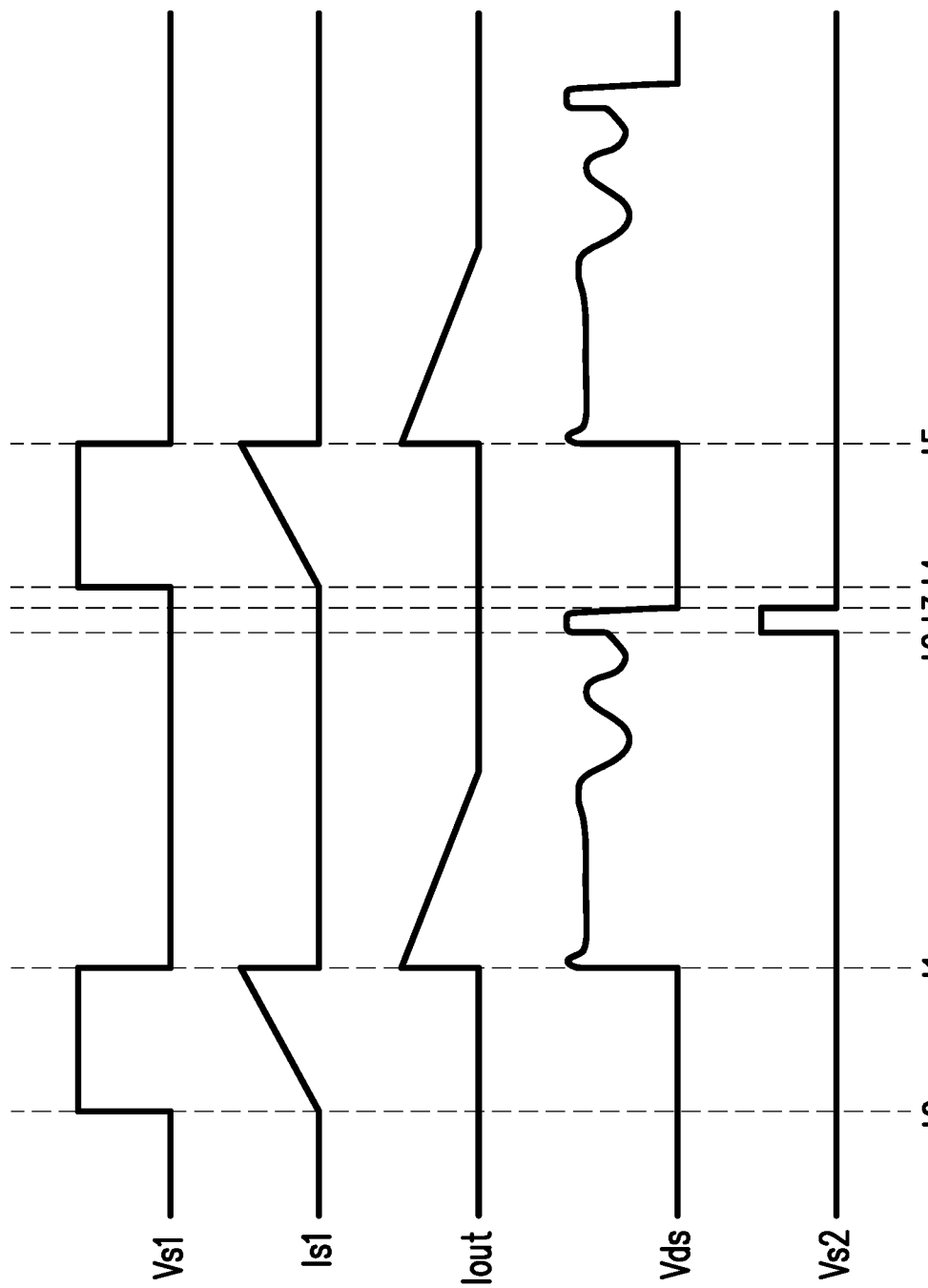
FIG. 3 is a schematic waveform diagram of a control signal of a main switch, a current and an output current of a primary side winding, a cross-voltage of the main switch, and a control signal of an auxiliary switch according to an embodiment of the invention.

As shown in FIG. 3, between a time point t0 and a time point t1, a control signal Vs1 output by the control circuit 104 to the main switch SW1 is switched to a high voltage level to enable the main switch SW1 to enter an on-state. In another aspect, a control signal Vs2 output by the control circuit 104 to the auxiliary switch SW2 is a low voltage level. In this way, a current Is1 of the primary side winding W1 is linearly increased.

Between the time point t1 and a time point t2, the control signal Vs1 output by the control circuit 104 to the main switch SW1 is switched into a low voltage level to enable the main switch SW1 to enter an off-state. Energy stored in a magnetizing inductance of the transformer circuit 102 is transferred to the secondary side winding W2 to enable the diode D1 be turned on. An output current Iout is quickly increased and then decreases linearly. In addition, a cross-voltage Vds of the main switch SW1 (in the present embodiment, the main switch SW1 is implemented by a transistor) is switched from a low voltage level into a high voltage level. In addition, the leakage inductance energy of the transformer circuit 102 is also transferred to the leakage inductance energy recovery circuit 106 between the time points t1 and t2. Because the auxiliary switch SW2 is in an off-state between the time points t1 and t2, the leakage inductance energy transferred to the leakage inductance energy recovery circuit 106 forms a circulating current in a loop formed by the primary side auxiliary winding W3, a parasitic diode (not shown) of the auxiliary switch SW2, and the capacitor Cs and is stored in the capacitor Cs. The leakage inductance energy stored in the capacitor Cs is transferred to the control circuit 104 through the diode D1 for use when the main switch SW1 is turn on the next time (a time point t4). When the output current Iout linearly decreases to 0, the diode D1 is turned off, and the magnetizing inductance of the transformer circuit 102 resonates with a parasitic capacitor of the main switch SW1, to correspondingly cause oscillation in the cross-voltage Vds of the main switch SW1.

In addition, apart from that the leakage inductance energy is recovered by the leakage inductance energy recovery circuit 106, a small part of the leakage inductance energy may be transferred to the snubber circuit 108 to be absorbed by the snubber circuit 108. Furthermore, when the main switch SW1 enters an off-state, the diode D3 is turned on, and the leakage inductance energy charges the capacitor C2. The diode D3 then enters a cut-off state, electric energy stored in the capacitor C2 is discharged through the resistor R1, and a part of energy stored in the capacitor C2 is wasted, to maintain a buffering effect during the next period in which the main switch SW1 is off.

Between the time point t2 and a time point t3, the control circuit 104 may control the auxiliary switch SW2 to enter an on-state, to recover the stored energy of the cross-voltage of the main switch SW1 by using the energy conversion of the leakage inductance energy stored in the leakage inductance energy recovery circuit 106. As shown in FIG. 3, at this time, the cross-voltage Vds of the main switch SW1 is also correspondingly increased and quickly decreases to be lower than the preset voltage (For example, the cross-voltage Vds decreases to 0 V. However, the invention is not limited thereto. A user can change a conduction time of the auxiliary switch SW2 according to an actual requirement for adjustment), to achieve an effect of recovering the stored energy of the cross-voltage of the main switch SW1. In this way, when being switched to an on-state at the time point t4, the main switch SW1 can perform zero voltage switching. When the main switch SW1 is turned on at the time point t4, the leakage inductance energy recovery circuit 106 may further transfer the leakage inductance energy stored in the capacitor Cs to the control circuit 104 to be used through the diode D1.

It should be noted that, between the time points t2 and t3, the leakage inductance energy stored in the leakage inductance energy recovery circuit 106 may be released when being transferred as the energy of the cross-voltage of the main switch SW1 for recovery. Therefore, when the main switch SW1 enters an off-state at a time point t5, the leakage inductance energy of the transformer circuit 102 is preferentially transferred to the overloaded leakage inductance energy recovery circuit 106 for storage. In this way, only a small part of the leakage inductance energy is absorbed by the snubber circuit 108. Therefore, the loss of the snubber circuit 108 can be effectively reduced. In an ideal case, the leakage inductance energy recovery circuit 106 can even recover all leakage inductance energy, and no leakage inductance energy is absorbed by the snubber circuit 108. In addition, the auxiliary switch SW2 in the present embodiment may be implemented by a low voltage switch and integrated into an integrated circuit. Compared with the prior art, a high voltage switch needs to be used to implement the leakage inductance energy recovery circuit. The voltage conversion apparatus in the present embodiment can effectively reduce manufacturing costs.

Based on the foregoing, the leakage inductance energy recovery circuit according to the embodiment of the invention recovers the leakage inductance energy of the transformer circuit to supply the operating power to the control circuit, and the energy conversion of the leakage inductance energy stored in the leakage inductance energy recovery circuit is used to recover the stored energy of the cross-voltage of the main switch during the period of cross-voltage energy storage recovery before the main switch is in an off-state and is about to enter an on-state, to enable the cross-voltage of the main switch to be lower than the preset voltage when the main switch is switched from an off-state to an on-state, thereby implementing zero voltage switching. In addition, the leakage inductance energy of the transformer circuit tends to be preferentially stored in the leakage inductance energy recovery circuit when the main switch is switched to an off-state the next time, thereby reducing a loss of the snubber circuit. In addition, the auxiliary switch in the present embodiment of the invention, may be implemented by a low voltage switch. Compared with the prior art, a high voltage switch needs to be used to implement the leakage inductance energy recovery circuit. The voltage conversion apparatus in the present embodiment can effectively reduce manufacturing costs.

Although the invention has been disclosed above with the embodiments, the embodiments are not intended to limit the invention. Any person of ordinary skill in the art can make some changes and modifications without departing from the spirit and scope of the invention. Therefore, the scope of protection of the invention shall be subject to the appended claims.

What is claimed is:

1. A voltage conversion apparatus, comprising:
   a transformer circuit, comprising a primary side winding, a primary side auxiliary winding, and a secondary side winding, receiving an input voltage, and outputting an output voltage to a load;
   a main switch, coupled between the primary side winding and a ground;
   a control circuit, coupled to the main switch, and controlling the main switch to periodically switch between an on-state and an off-state to control output of the transformer circuit; and
   a leakage inductance energy recovery circuit, coupled to the primary side auxiliary winding and the control circuit, and recovering leakage inductance energy of the transformer circuit to supply an operating power to the control circuit, wherein before the main switch is turned on the next time, energy conversion of the leakage inductance energy recovered by the leakage inductance energy recovery circuit is used for performing zero-voltage switching of the main switch,
   wherein the leakage inductance energy recovery circuit comprises:
   a first capacitor, wherein a first terminal of the first capacitor is coupled to the primary side auxiliary winding;
   an auxiliary switch, coupled between a second terminal of the first capacitor and the ground, wherein a control terminal of the auxiliary switch is coupled to the control circuit, and the control circuit turns on the auxiliary switch during a period of cross-voltage energy storage recovery before the main switch enters an on-state, to provide a cross-voltage energy storage recovery path, so that the cross-voltage of the main switch is lower than a preset voltage when the main switch is switched from an off-state to an on-state;
   a diode, wherein an anode and a cathode of the diode are respectively coupled to the second terminal of the first capacitor and the control circuit; and
   a second capacitor, coupled between the cathode of the diode and the ground.

2. The voltage conversion apparatus according to claim 1, wherein the main switch provides a cross-voltage energy storage recovery path during a period of cross-voltage energy storage recovery before entering an on-state, to perform energy conversion on the leakage inductance energy stored in the leakage inductance energy recovery circuit, so that the cross-voltage of the main switch is lower than a preset voltage when the main switch is switched from an off-state to an on-state.

3. The voltage conversion apparatus according to claim 1, wherein the main switch and the auxiliary switch are transistors.

4. The voltage conversion apparatus according to claim 1, further comprising:

a snubber circuit, coupled between two terminals of the primary side winding.

5. The voltage conversion apparatus according to claim 4, wherein the snubber circuit comprises:
- a capacitor, wherein a first terminal of the capacitor is coupled to a first terminal of the primary side winding;
- a resistor, wherein a first terminal of the resistor is coupled to the first terminal of the primary side winding; and
- a diode, wherein a cathode of the diode is coupled to the capacitor and a second terminal of the resistor, and an anode of the diode is coupled to a second terminal of the primary side winding.

\* \* \* \* \*